(12) United States Patent
Sundheim et al.

(10) Patent No.: US 10,611,589 B2
(45) Date of Patent: Apr. 7, 2020

(54) AUTO FILM SPLICING ASSEMBLY WITH FILM ROLL POSITIONER

(71) Applicant: Douglas Machine Inc., Alexandria, MN (US)

(72) Inventors: Corey S. Sundheim, Starbuck, MN (US); Adnanul Haq, Alexandria, MN (US); Matthew D. Toyli, Parkers Prairie, MN (US)

(73) Assignee: Douglas Machine Inc., Alexandria, MN (US)

( * ) Notice: Subject to any disclaimer, the term of this patent is extended or adjusted under 35 U.S.C. 154(b) by 0 days.

(21) Appl. No.: 15/579,837

(22) PCT Filed: Jun. 3, 2016

(86) PCT No.: PCT/US2016/035670
§ 371 (c)(1),
(2) Date: Dec. 5, 2017

(87) PCT Pub. No.: WO2016/196896
PCT Pub. Date: Dec. 8, 2016

(65) Prior Publication Data
US 2018/0334347 A1    Nov. 22, 2018

Related U.S. Application Data

(60) Provisional application No. 62/322,882, filed on Apr. 15, 2016, provisional application No. 62/233,138, (Continued)

(51) Int. Cl.
*B29C 65/00* (2006.01)
*B65H 19/18* (2006.01)
(Continued)

(52) U.S. Cl.
CPC ......... *B65H 19/1852* (2013.01); *B65H 16/00* (2013.01); *B65H 26/00* (2013.01);
(Continued)

(58) Field of Classification Search
CPC . B29C 65/2038; B29C 65/22; B29C 65/7802; B29C 65/7897; B29C 66/41
(Continued)

(56) References Cited

U.S. PATENT DOCUMENTS

| | | | |
|---|---|---|---|
| 3,516,889 A | 6/1970 | Boynton et al. | |
| 3,814,652 A | 6/1974 | King | |

(Continued)

FOREIGN PATENT DOCUMENTS

| | | |
|---|---|---|
| CN | 100488857 C | 5/2009 |
| DE | 20209571 U1 | 8/2002 |
| JP | 9-272512 A | 10/1997 |

OTHER PUBLICATIONS

International Search Report and Written Opinion from PCT/US2016/035670; 9 pages; Lee W. Young; dated Sep. 1, 2016.
(Continued)

*Primary Examiner* — Mark A Osele
*Assistant Examiner* — Nickolas R Harm
(74) *Attorney, Agent, or Firm* — Dicke, Billig & Czaja, PLLC

(57) ABSTRACT

A splicing assembly for rolled sheet material, including first and second shafts for support of sheet material and a drive assembly for selectively dispensing sheet material. The assembly further includes a splicing apparatus for uniting a replacement with a winding down roll, and an egress guide assembly for receipt of dispensed sheet material exiting the splicing apparatus and passage of same intermediate the shafts. The splicing apparatus includes first and second sealing elements, and first and second carriages adapted and
(Continued)

disposed for translation towards their respective sealing elements, a free end portion of sheet material of the replacement roll supported upon the first/second shaft for selective retention by the second/first sheet material carriage, and for translation to, and thereafter with, a portion of sheet material of the winding down roll supported upon the second/first shaft for urged combined engagement with a corresponding sealing element.

18 Claims, 7 Drawing Sheets

Related U.S. Application Data filed on Sep. 25, 2015, provisional application No. 62/171,030, filed on Jun. 4, 2015.

(51) Int. Cl.
| | | |
|---|---|---|
| B65H 16/00 | (2006.01) | |
| B65H 26/00 | (2006.01) | |
| B29C 65/20 | (2006.01) | |
| B29C 65/22 | (2006.01) | |
| B29C 65/78 | (2006.01) | |

(52) U.S. Cl.
CPC .......... *B29C 65/2038* (2013.01); *B29C 65/22* (2013.01); *B29C 65/7802* (2013.01); *B29C 66/41* (2013.01); *B65H 2301/4621* (2013.01); *B65H 2301/4634* (2013.01); *B65H 2301/46412* (2013.01)

(58) Field of Classification Search
USPC .... 156/157, 304.1, 364, 495, 502, 504, 507, 156/556, 565
See application file for complete search history.

(56) References Cited

U.S. PATENT DOCUMENTS

| 4,214,419 | A | 7/1980 | Allen et al. |
|---|---|---|---|
| 4,722,489 | A | 2/1988 | Wommer |
| 5,330,126 | A | 7/1994 | Grischenko |
| 5,411,223 | A | 5/1995 | Gatteschi |
| 5,863,381 | A | 1/1999 | Magota et al. |
| 6,820,837 | B2 | 4/2004 | Long |
| 6,817,566 | B2 | 11/2004 | Clifford et al. |
| 6,880,313 | B1 | 4/2005 | Gessford et al. |
| 7,032,360 | B2 | 4/2006 | Rutten et al. |
| 7,178,756 | B2 | 2/2007 | Reinke |
| 7,263,812 | B2 | 9/2007 | von Triel et al. |
| 7,322,541 | B2 | 1/2008 | Fairchild |
| 7,832,553 | B2 | 11/2010 | Hartness et al. |
| 7,849,770 | B2 | 12/2010 | Folding et al. |
| 7,850,003 | B2 | 12/2010 | Hartness et al. |
| 7,861,490 | B2 | 1/2011 | Hartness et al. |
| 7,980,504 | B2 | 7/2011 | Butterworth |
| 8,186,896 | B2 | 5/2012 | Frost et al. |
| 8,381,787 | B2 | 2/2013 | Elsperger |
| 2008/0142407 | A1 | 6/2008 | Moore |
| 2011/0056175 | A1 | 3/2011 | Harness et al. |
| 2011/0099949 | A1 | 5/2011 | Hartness et al. |
| 2011/0147258 | A1 | 6/2011 | Hartness et al. |
| 2013/0067864 | A1 | 3/2013 | Dwyer |
| 2014/0209249 | A1 | 7/2014 | Bevilacqua et al. |

OTHER PUBLICATIONS

International Preliminary Report on Patentability from PCT/US2016/035670; 7 pages; Simin Baharlou; dated Dec. 14, 2017.

AUTO FILM SPLICING ASSEMBLY WITH FILM ROLL POSITIONER

This is an international patent application filed under 35 USC § 363 claiming priority under 35 USC § 120 of/to U.S. Pat. Appl. Ser. Nos. 62/171,030, 62/233,138 & 62/322,882, filed Jun. 4, 2015, Sep. 25, 2015 & Apr. 15, 2016 respectively, each of which incorporated by reference in its entirety.

TECHNICAL FIELD

The present invention is generally directed to one or more of systems, apparatuses, assemblies, subassemblies, and/or methods for effectuating rolled sheet material splicing operations. More particularly, the instant disclosure is directed advantageously but not exclusively to the automatic and/or semiautomatic splicing of heat shrink film from a "ready" roll to an "unwinding" roll as part of a heat shrink article bundling operation. Moreover, devices and/or subassemblies for film roll positioning are likewise contemplated and disclosed.

BACKGROUND

Shrink wrap systems are utilized to effectively overwrap and/or bundle articles such as bottles, cans, cartons, tubes, etc. into a wide variety of pack patterns for the food and beverage industry. The bundles may be film only, or supplemented by a pad, a u-board or a tray. As to the bundling, rates from 25 to 150 cycles per minute generally delimit the range, with the shrink film characterized by widths of within a range of about 10-32 inches, with widths of 30-32 inches commonplace. Film stands may be integrated or side mounted. As to the process, we note Applicant's U.S. Pat. Nos. 7,032,360 & 7,849,770, each incorporated herein by reference in its entirety.

Film is commonly provided in the form of rolls for dispensing and consumption during downstream processing in numerous and varied processes implicating same. Moreover, sheeting material generally is commonly supplied in a roll format for like consumption during downstream processing. In the context of consumed sheet material from a roll of rolled sheet material, as the content of the roll is depleted, the "winding down" roll must be replaced with a fresh/new roll. As it is important that the sheet material consuming apparatus operate without stoppage, roll exchange operations are advantageously conducted in at least a semi-automated fashion. Joining modules or the like connect or unite a free end portion of a fresh/replacement roll with a portion of an almost depleted winding down roll.

An accumulator is commonly, but not necessarily, used downstream of the splicer/splicing operation, and upstream of the film consuming apparatus. The accumulator functions as a buffer to support continuous or at least semi-continuous downstream operations. Notionally, the accumulator retains a sufficient length of sheet material for consumption during the period of splicing operations in connection to post dispensing operations (e.g., sheet cutting, article wrapping, etc.) in furtherance of maintaining/supporting at least semi-continuous downstream operations and keeping operational down time to a minimum.

Splicing may be effectuated via a lap splice, a butt splice or a heat seal. The following teachings are directed to film dispensing apparatus/operations characterized by splicing a fresh replacement roll with a depleted winding down roll, namely, U.S. Pat. No. 5,411,223 (Gatteschi); U.S. Pat. No. 5,863,381 (Magota et al.); U.S. Pat. No. 6,820,837 (Long); U.S. Pat. No. 7,263,812 (von Triel et al.); and, U.S. Pat. No. 8,381,787 (Elsperger). While advances appear present, the disclosed approaches general rely upon numerous pieces-and-parts requiring a high degree of synchronicity to insure proper operation, with most occupying not an insubstantial operational foot print on the plant floor. Moreover, operator access is oftentimes limited, with maintenance and roll replenishing tasks being thusly hamstrung.

A further, not fully appreciated aspect of heretofore described operations is roll positioning. Since the sheet material rolls are often arranged in a lower machine level, unfavorable ergonomic conditions exist for the handling of such rolls. Positioning a large roll can be difficult because it may weigh up to 200 pounds. When trying to move/locate the roll to a scaled position on a mandrel/shaft operatively supporting same, the roll tends to take a lot of force to get it moving, and once in motion, it can be difficult to stop with precision, thus making it difficult to position within ⅛ inch accuracy to sustain acceptable process operations.

Change part cores or collars are known to be used for positioning a new roll on a shaft, such cores/collars fabricated to a specific length for each different film width that is run. With numerous change parts required for each shaft, an inventory of/for same can become difficult to manage for the many different film sizes contemplated. Moreover, such structures typically register against the film core which is not always accurate, representative or correlative of/to the film edge(s). Further still, in the context of the contemplated auto splice assembly, there is less access to the lower roll, making positioning especially challenging.

Thus, in light of the foregoing, there remains a need for a compact, versatile, and reliable sheet material splicing assembly. Moreover, a sheet material splicing assembly characterized by reduced pieces-and-parts while nonetheless maintaining supreme functionality is believed advantageous. Further still, it is believed desirable to provide an especially operator friendly sheet material splicing assembly, advantageously, but not necessarily, one characterized by an automatic positioner to locate a roll of rolled sheet material at a select point upon a shaft or mandrel for operatively supporting same.

SUMMARY OF THE INVENTION

A splicing assembly for rolled sheet material is generally provided. The assembly includes first and second shafts, each shaft for operative support of a roll of rolled sheet material, and a drive assembly operatively linked to each of the shafts in furtherance of selectively dispensing rolled sheet material from the rolls carried upon/by the shafts. The assembly further includes a splicing apparatus for uniting a replacement roll of rolled sheet material with a winding down roll of rolled sheet material, and an egress guide assembly for receipt of dispensed sheet material exiting the splicing apparatus, and passage of same intermediate the shafts.

The splicing apparatus advantageously includes first and second sealing elements, and first and second sheet material carriages adapted and disposed for translation towards their respective first/second sealing elements. A free end portion of rolled sheet material of the replacement roll is supported or supportable upon the first/second shaft for selective retention by the second/first sheet material carriage, and for translation to, and thereafter with, a portion of rolled sheet material of the winding down roll supported upon the second/first shaft for urged combined engagement with a corresponding sealing element of either of the first/second sealing element in furtherance of uniting the rolled sheet material of the rolls.

The splicing assembly further, and advantageously, includes, but not necessarily so, a rolled sheet material roll positioner. The positioner is generally characterized by a linear actuator and a pusher plate operatively united therewith. Upon loading a roll upon a shaft, the loaded roll is advantageously translated into abutting engagement with a stop or the like. Thereafter, the roll positioner is initialized, via an integrated positioner control module part-and-parcel of an assembly controller, activated and actuated such that the pusher plate extends so as to engage the rolled sheet material of the roll and thus urgingly translate same upon the shaft in furtherance of selectively positioning the roll distal of the stop. More specific features and advantages obtained in view of the summarized features will become apparent with reference to the drawing figures and DETAILED DESCRIPTION OF THE INVENTION.

BRIEF DESCRIPTION OF THE DRAWINGS

FIGS. 1-8 are provided herewith wherein:

FIG. 1 is a first side perspective view of an advantageous, non-limiting loaded auto-film splicing assembly, guarding elements omitted to reveal underlying particulars for a splicing apparatus thereof;

FIG. 2 depicts the assembly of FIG. 1, second side elevation view, elements and/or structures thereof omitted to reveal further assembly particulars;

FIG. 3 depicts the assembly as per FIG. 1, elements and/or structures thereof omitted to reveal assembly particulars;

FIG. 4 depicts the assembly of FIG. 3, perspective rear view;

FIG. 5 depicts a disembodied splicing apparatus of the FIG. 3 assembly, second side perspective view;

FIG. 6 depicts the apparatus of FIG. 5, second side elevation view, elements and/or structures thereof omitted to reveal further assembly particulars;

FIG. 7 depicts assembly particulars of area 7 FIG. 4, slightly from above with reference thereto; and, FIG. 8 depicts assembly particulars of area 8 FIG. 4, slightly from above with reference thereto, more particularly, an upper film roll positioner thereof.

DETAILED DESCRIPTION OF THE INVENTION

The instant disclosure generally sets forth an illustrative, non-limiting auto-film splicing assembly (FIGS. 1-4). Moreover, one or more apparatus or subassemblies thereof are illustratively particularized, more particularly, a film splicing apparatus (FIGS. 5 & 6), a film egress guide and sensing assembly (FIG. 7), and a film roll positioner (FIG. 8). While dispensing and splicing operations with regard to shrink film is advantageously contemplated, the subject assembly need not be so limited. Notionally, while the following description contextually proceeds with reference to film or shrink film positioning, dispensing and/or splicing, the contemplated assembly and/or its subassemblies need not be limited to film, as positioning, dispensing and/or splicing of rolled sheet material broadly is contemplated.

Figure 1:
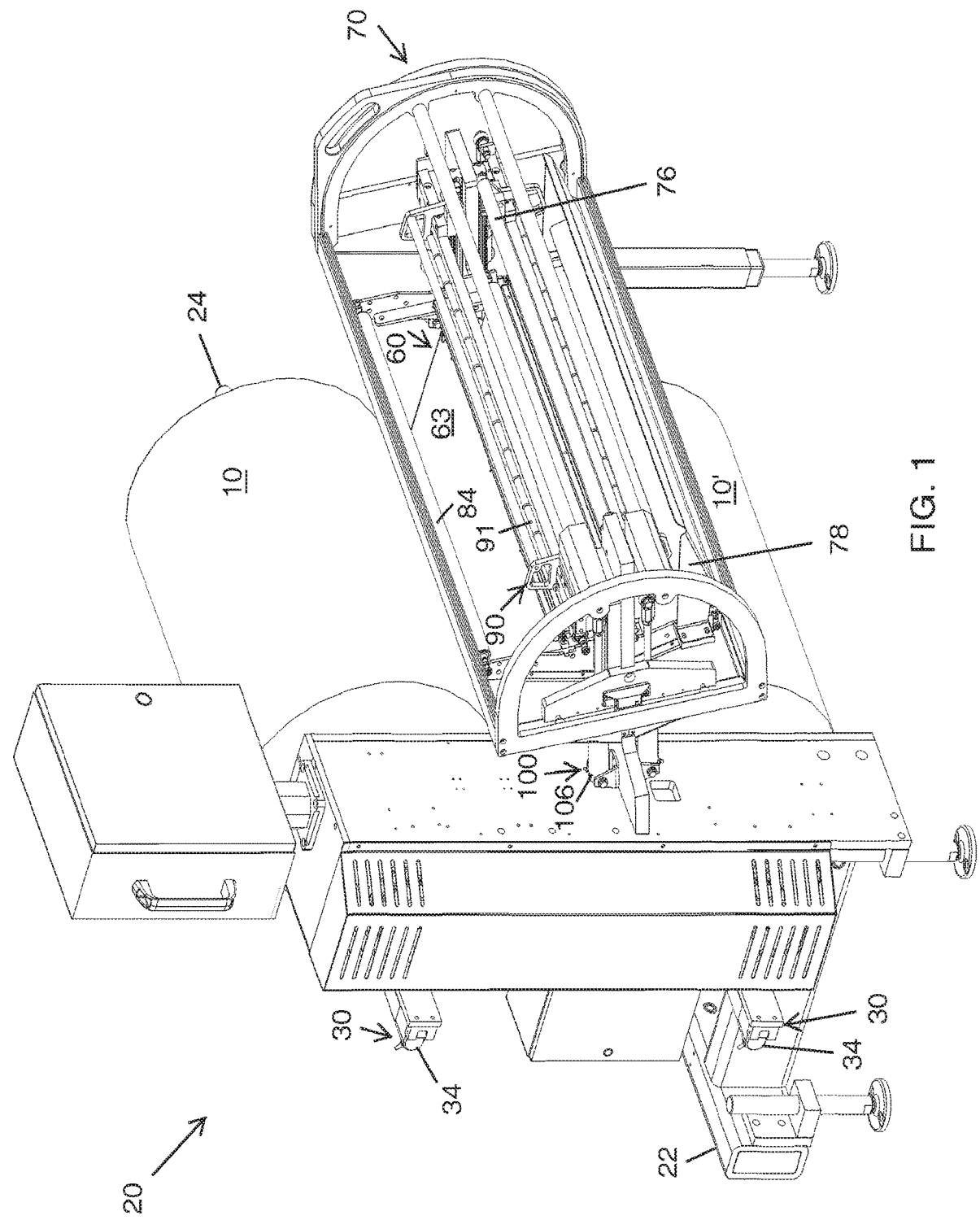
Figure 2:
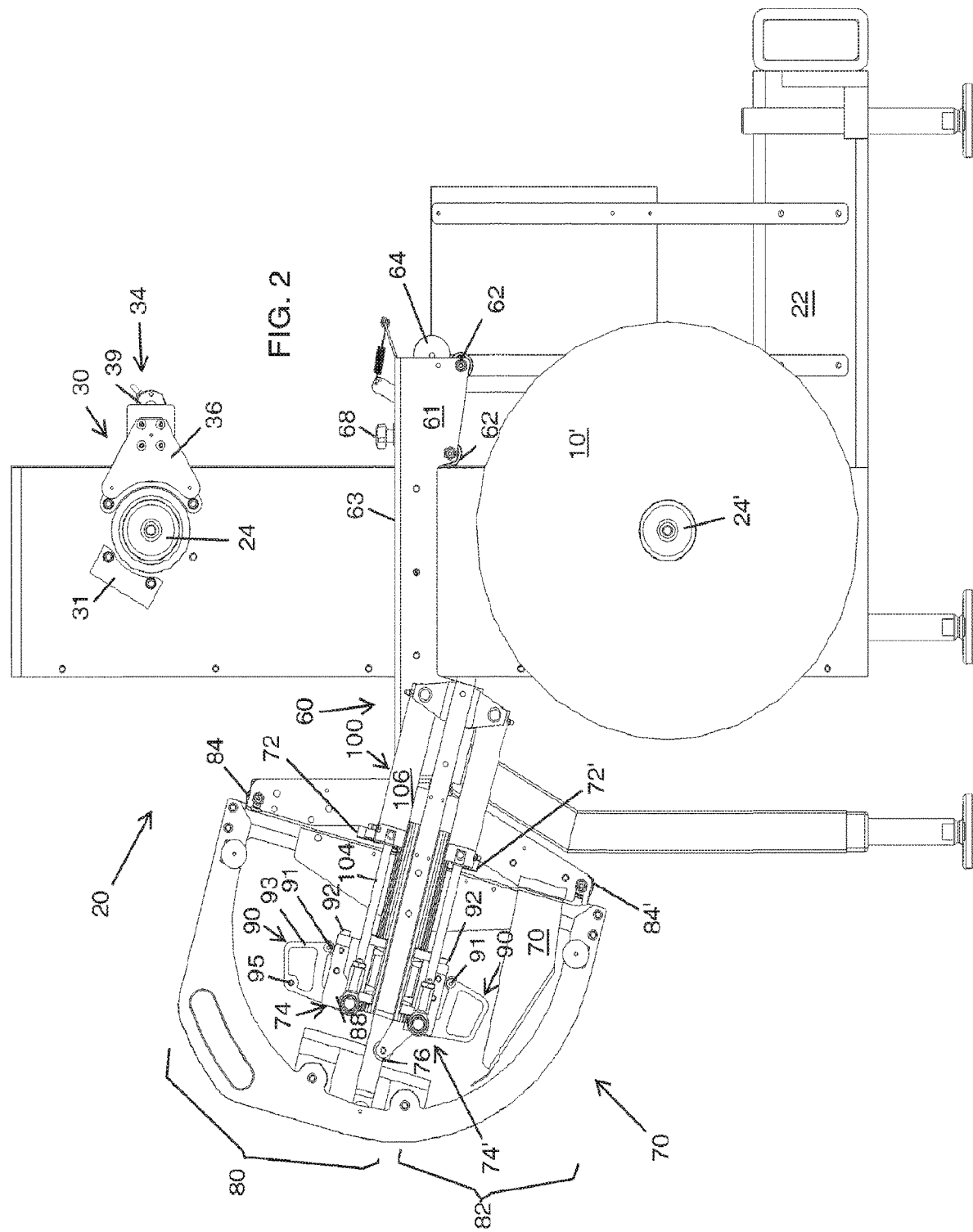

With initial reference to FIGS. 1-4, there is shown an advantageous film splicing assembly 20 equipped with film roll 10 (upper) and film roll 10' (lower) as per FIG. 1, the upper roll eliminated in the side elevation of FIG. 2. Common views of the assembly are set forth in FIGS. 1 & 3, elements and/or structures of the former omitted to reveal assembly particulars as per the latter, with FIG. 4 providing a contrary view of the FIG. 3 assembly.

Notionally, an assembly frame 22 supports upper and lower mandrels or shafts 24, 24', upper and lower film roll positioners 30, 30', and a drive assembly 40 operatively linked to each of shafts 24, 24'. Further supported by frame 22 is a film egress guide assembly 60, generally disposed intermediate shafts 24 and 24', and a film splicing apparatus 70, forward of the shafts.

For the sake of context, and in advance of details, some preliminary observations are believed advantageous. Without limitation, the instant assembly is advantageously provided part-and-parcel of Applicant Douglas Machine Inc.'s Contour™ shrink wrap systems. Film is generally dispensed from the shafted film rolls via clock-wise rotation so as to exit from the rear or back side of the assembly, page right FIG. 2, opposite the operator accessible film splicing apparatus. Dispensed film thereafter passes about downstream deflector rollers in advance of passage to and through a film accumulator (e.g., dancer bars, not shown) which regulates the film feed to the further downstream film consuming apparatus so as to maintain operational flow continuity.

With general reference now to FIGS. 2-4 & 8, film rolls 10, 10' are operatively supported upon upper and lower shafts 24, 24'. Advantageously, but not necessarily, the shafts are coplanar (FIG. 2). Free ends of the shafts are readily operator accessible in furtherance of initial loading a film roll upon a shaft via operator transfer of same from a trolley or cart. The loaded roll is advanced upon and along the shaft towards a portion of assembly frame. More particularly, a stop or bumper 31 is supported upon a portion of frame 22 adjacent a shaft through hole, contact of the film roll with the bumper indicating an initial or starting position for the roll upon the shaft. Thereafter, the roll positioner is initialized, via an integrated positioner control module part-and-parcel of an assembly controller, activated and actuated so as to selectively position the roll distally from the stop.

Figure 4:
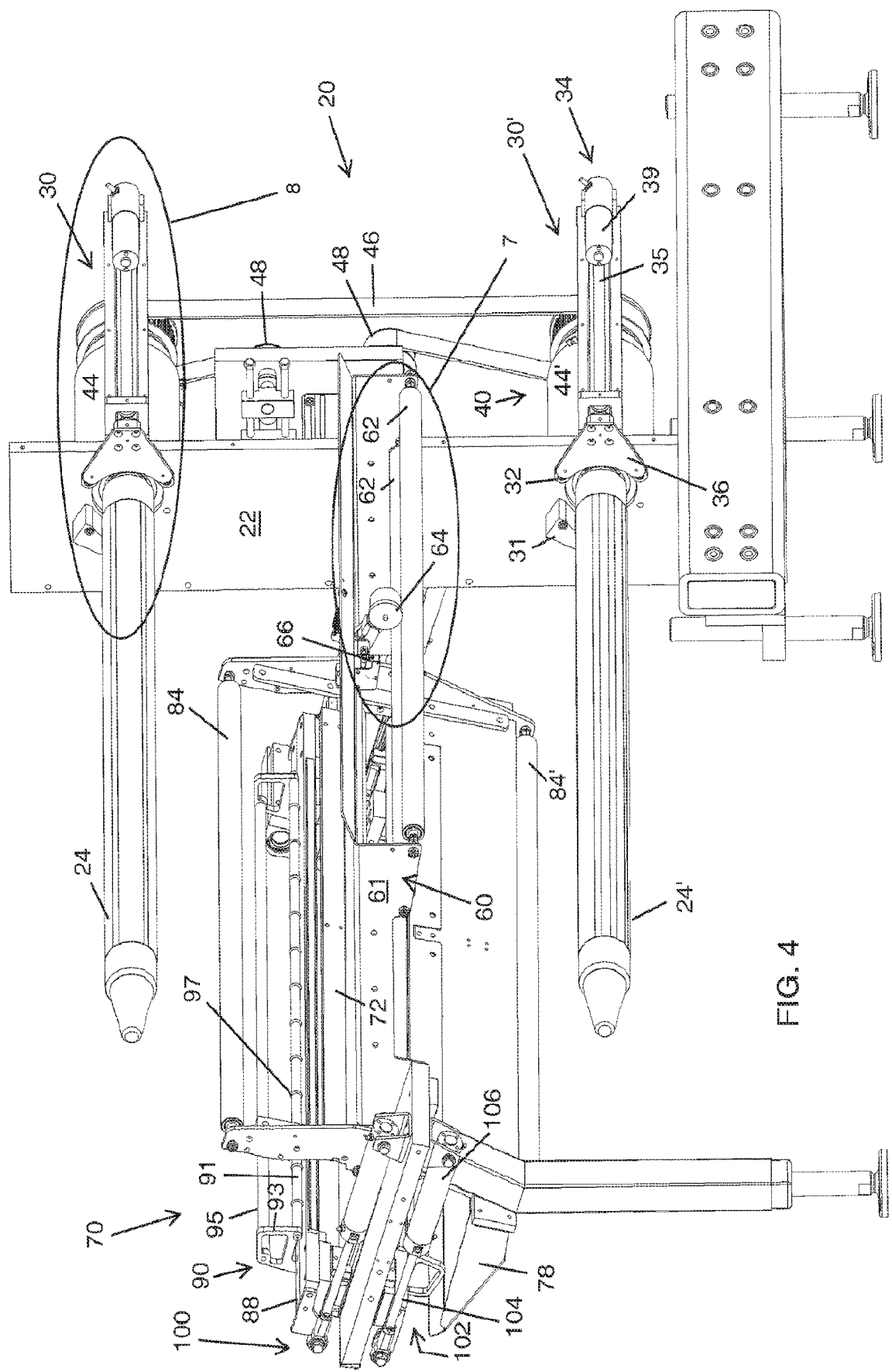

An advantageous, non-limiting roll positioner 30 is best seen and appreciated with reference to FIGS. 2 & 4, and specifically FIG. 8. It is to be noted that the positioner facilitates roll loading operations and thus enables easy, repeatable, certain placement in furtherance of dispensing aligned/in-registration film. Moreover, it is to be appreciated and understood that the contemplated positioner need not be limited to applications or processes characterized by rolled sheet material splicing, instead, it is believed advantageous broadly, namely, in selectively positioning of a roll of rolled sheet material upon a mandrel.

Positioner 30 is fairly characterized by a linear actuator 34 and a pusher plate 36 operatively united therewith. The positioner, like the bumper, is supported by a portion of the frame assembly adjacent the shaft through hole via a bracket 32. Actuator 34 generally includes a housing 35 from which a translating shaft 37 is extendibly driven via an actuator motor 39, push plate 36 operatively linked to a free end portion of translating shaft 37. Via a programmable controller/control module (not shown), translating shaft 37 selectively extends so as to urgingly engage the film of the film roll via push plate 36 in furtherance of selectively positioning the roll upon the shaft. Moreover, it is to be noted that the positioner may be advantageously actuated in furtherance of removing a roll from its shaft in addition to positioning a roll on its shaft.

Figure 3:
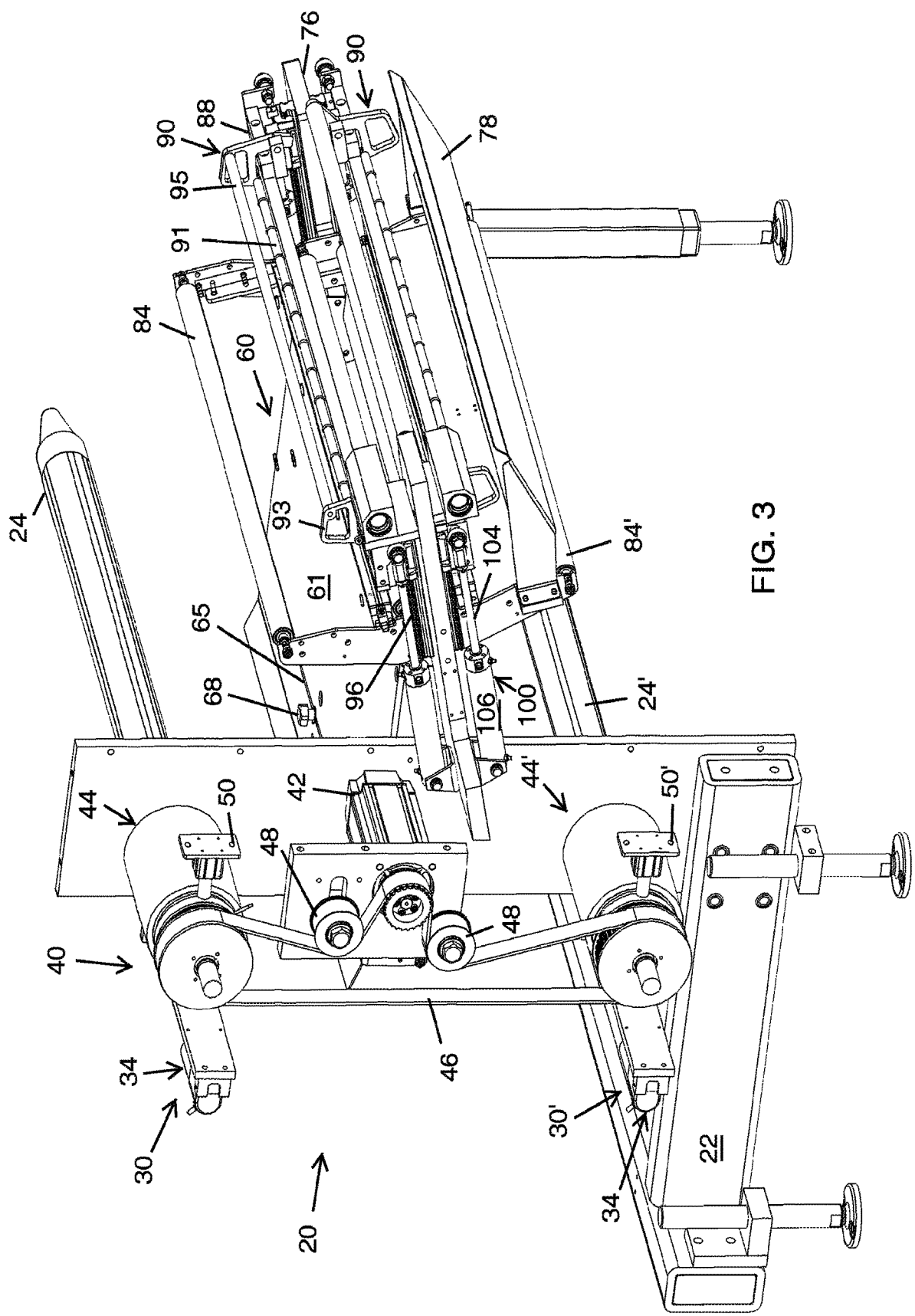

With reference to FIG. 3, and optionally to FIGS. 4 & 8, there is generally shown drive assembly 40 for rotating the film roll shafts. The assembly advantageously includes a servo-drive 42 operatively linked with/to clutch assemblies 44 & 44', via a belt 46 and guides 48 as shown, clutch assemblies 44, 44' corresponding to upper and lower shafts 24, 24', each clutch assembly in turn operatively linked with its corresponding shaft. Tensioners 50, 50' are advantageously provided for each clutch assembly, for selective engagement therewith, so as to manage (i.e., minimize or eliminate) clutch free-spooling and related uncontrolled/unwanted film dispensing. Via later described sensing and controlling, film roll shafts may be selectively driven, with regard to speed and direction, in furtherance of executing an aligned/registered film splice and to impart a separation or break of the united combination of the free end of sheet material of the replacement roll (i.e., the "tail") and the remnant winding down roll relative to the advancing portion of the winding down roll to which the replacement roll is joined.

Figure 5:
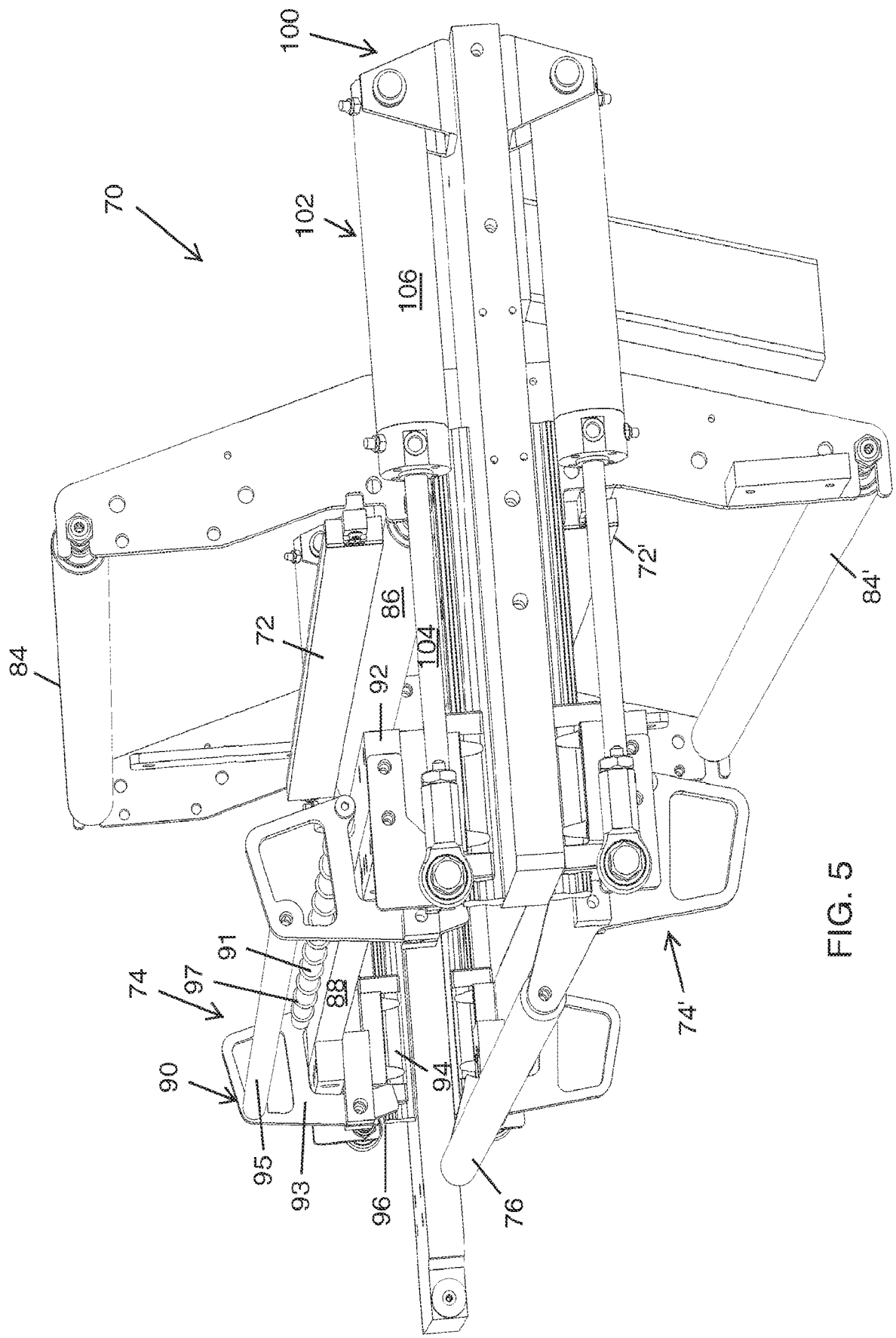
Figure 6:
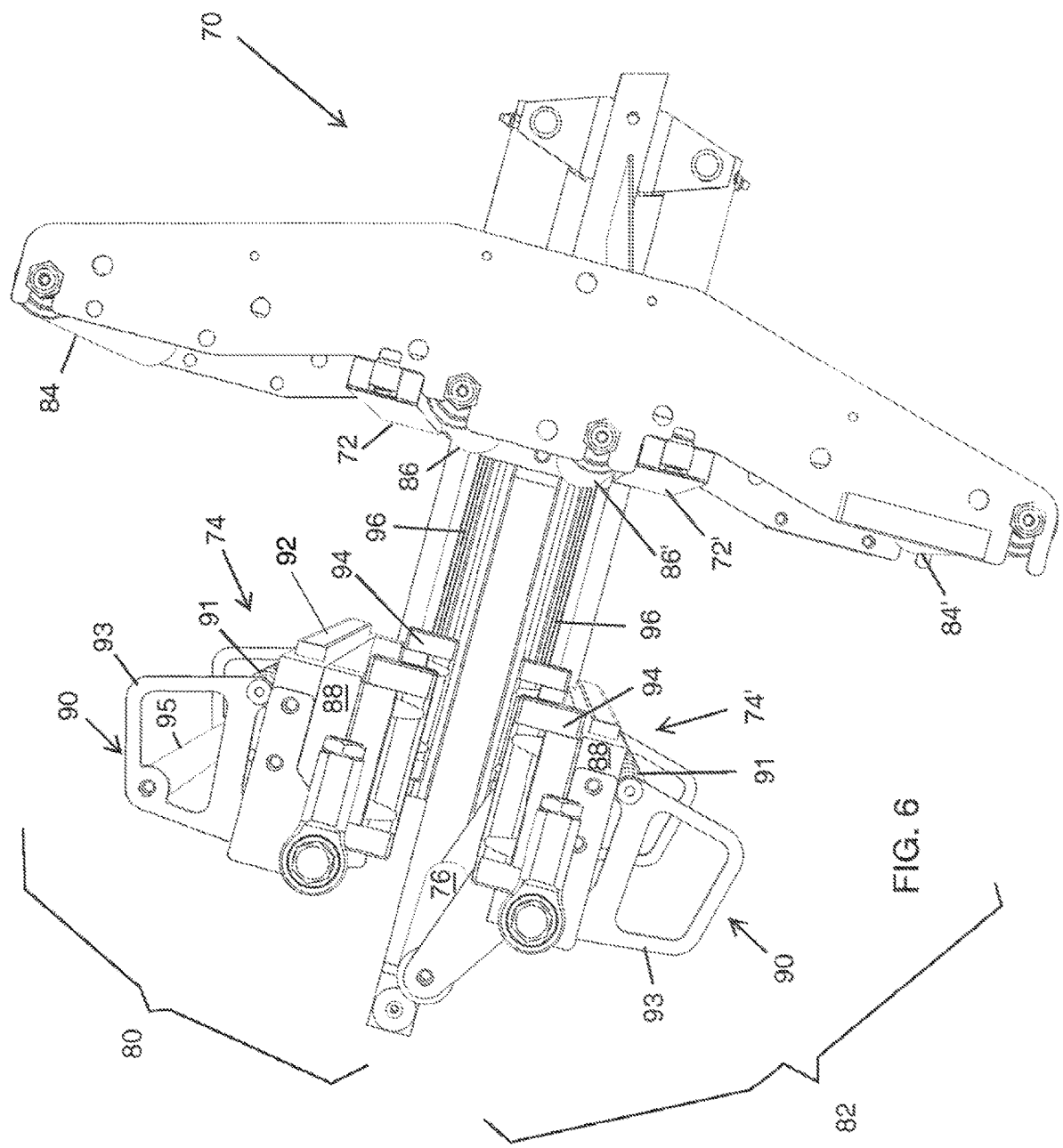

With reference now to FIGS. 5 & 6, an advantageous, non-limiting splicing apparatus is shown in two views. As is readily appreciated with reference to FIG. 2, the instant apparatus is positioned in the assembly in a spaced apart condition relative to the shafts thereof, the apparatus considered, for the sake of convention, to be "forward" of the shafts, more particularly as shown, forward of a common plane within which the shafts lie. The apparatus is positioned for easy operator access. Downstream of the apparatus is film egress guide assembly 60, dispensed film generally passing intermediate spaced apart shafts 24, 24'.

The splicing apparatus is generally characterized by a first sealing element 72, a second sealing element 72', a first sheet material carriage 74 adapted and disposed for translation towards first sealing element 72, and a second sheet material carriage 74' adapted and disposed for translation towards second sealing element 72'. Notionally, and to facilitate subsequent discussion, the apparatus may be fairly characterized as having upper 80 and lower 82 portions as indicated, first sealing element 72 thusly being an upper sealing element, second sealing element 72' thusly being a lower sealing element as per the subject convention, generally indicated via inclusion of a prime (') in connection to a reference character.

First 84, 84' and second 86, 86' deflector rollers, supported by portions of apparatus frame 22, direct dispensed sheet material from a roll of rolled sheet material carried by the shafts. Second deflector roller 86, 86' is downstream of first deflector roller 84, 84'. As arranged and appreciated with reference to FIG. 6, the second deflector roller deflectingly directs the dispensed sheet material at an angle of about 90 degrees, the dispensed sheet material thereafter passing intermediate the shafts for passage to and through guide rollers 62 of film egress guide assembly 60 (see e.g., FIG. 2 and/or FIG. 4). First 72 and second 72' sealing elements are disposed along a film travel segment delimited by each of the first 84, 84' and second 86, 86' deflector rollers, and adjacent the second deflector rollers. Via such arrangement, dispensed sheet material from an active roll of sheet material passes over the sealing element.

The sheet material carriages are utilized in connection to readying a replacement roll, effectuating a cooperative engagement of a portion of/for sheet material of the replacement roll with a portion of the sheet material of the winding down roll and a pressing of the combined sheet materials against the sealing element to effectuate a union of sheet materials. Carriages 74, 74' are generally characterized by a body 88, a retainer 90 for securing a free end portion of sheet material of a replacement roll relative to body 88, and a pad or plate 92 for pressing engagement with its corresponding sealing element during carriage translation.

Notionally, the free end portion of sheet material of a replacement roll passes over a first deflector roller to and toward its opposite carriage (i.e., a lower disposed replacement roll has its free end portion retained at/upon the upper carriage, with an upper disposed replacement roll having its free end portion retained at/upon the lower carriage). As is appreciated with reference to FIG. 6, upon capture of the free end portion of sheet material of the replacement roll, an upstream segment of the sheet material of the replacement roll spans the first deflector roller and carriage, the segment overlying the pressing pad of the carriage. Via actuation of carriage drive assembly 100, the spanning segment of the replacement roll is drawn towards its corresponding sealing element, the spanning segment and a portion of the winding down roll sandwiched between the pressing pad and sealing element to unite same during sealing element actuation. As will later be discussed, via select operation the drive assembly (i.e., select driving of the shafts via clutching), separation of sheet material tail from remainder of the replacement, now active winding down roll is effectuated, the tail supporting during splicing operations by a support roller 76 overlying a tray 78 for retention of same (FIG. 2).

Carriage body 88 generally supports retainer 90 and pressing pad 92. Body 88 is adapted, via provisions of track blocks 94 depending at opposing ends thereof as shown, for operative receipt upon tracks or rails 96 carried upon opposing segments of apparatus frame 22. Carriage drive assembly 100 generally comprises a linear actuator 102, more particularly, and in combination, a rod 104 extendible from a pneumatic cylinder 106 as shown (FIG. 5), actuator 102 supported by apparatus frame 22 adjacent carriage track 96.

Retainer 90 is generally characterized by a retainer bar 91, and a pivotable frame 93 supporting same. Frame 93 is pivotably mounted proximal track blocks 94, more particularly, interior thereof (FIG. 5), and is advantageously equipped with a counterweight or counterbalance 95. The frame advantageously pivots away from the sealing elements of the apparatus (i.e., towards the operator). As shown, the retainer bar advantageously includes spaced apart o-rings 97 or the like to aid frictional engagement with the passing sheet material in furtherance of retaining same relative to the carriage body.

Pressing pad or plate 92 is carried by carriage body 88 so to extend from a surface or face thereof, more particularly, a body surface opposite the sealing member. Advantageously, the pad is longitudinally dimensioned so as to substantially extend across the sealing element in furtherance of establishing an appreciable spliced union of the sheet material of the replacement roll to/with the sheet material of the winding down roll. In the context of the subject film splicing operation, the sealing elements comprise heating elements, more particularly, resistive heating elements, the pad aiding substantial contact between, among and for the sheet material sourced from the rolled sheet material of each shaft to effectuate an heat sealing/union of the sheet materials.

Figure 7:
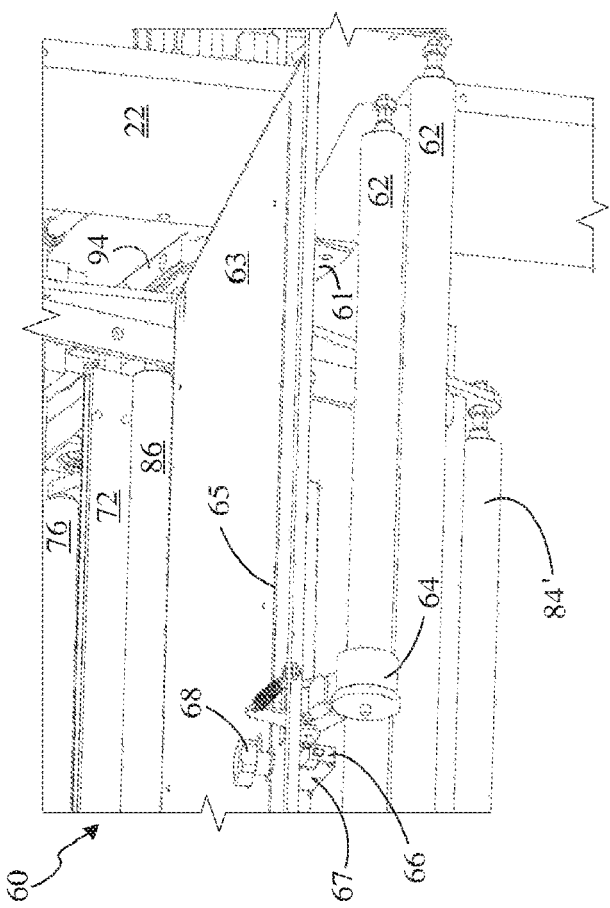
Figure 8:
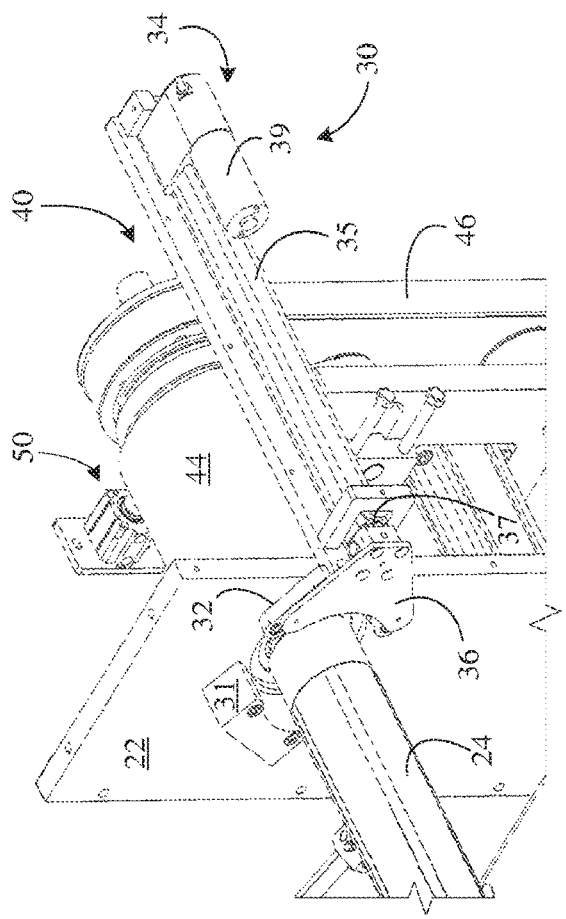

Referring now to FIG. 4 and especially FIG. 7, film egress guide and sensing assembly 60 guides and senses dispensed sheet material in advance of further downstream operations implicating same. Assembly 60 is generally characterized by a frame 61 which operative supports guide rollers 62, a panel 63 overlying same, and advantageously, but not necessarily, an encoder 64 and a photosensor 66 as shown (FIG. 7), each depending from panel 63. Frame 61 is mutually, but not exclusively, longitudinally supported by a portion of splicing assembly frame 22 (FIG. 2) and laterally at an upstream end portion by a structural element of splicing apparatus 70 in the vicinity of upper second deflector roller 86 (FIG. 7). Guide rollers 62 are generally carried at a free end portion of frame 61 and are axially offset in the direction of film flow and with regard to their relative elevation (FIG. 2) for passage of dispensed film.

Panel 63 is adapted so as to support encoder 64 which depends therefrom and is likewise adapted, via inclusion of a slot 65 as shown, to translatingly carry photosensor 66 which may be selectively positioned, via a slidable holder 67 and tensioner 68, transversely relative to the dispensed film, as may advantageous or necessary owing to the position of detectable indicia of the passing/dispensed film/sheet material. As is appreciated, the contemplated detecting/sensing elements are disposed intermediate the guide rollers (FIG. 2). Functionally, the encoder signals the controller of the splicing assembly relative to a depletion status of the winding down roll, with the photosensor aiding film registration and attendant roller manipulations via the drive assembly in furtherance thereof.

What has been described and illustrated herein is a preferred embodiment of Applicant's subject matter, along with some of its variations. Since the structures of the assemblies, subassemblies, and/or mechanisms disclosed herein may be embodied in other specific forms without departing from the spirit or general characteristics thereof, some of which forms have been indicated, the embodiments described and depicted herein/with are to be considered in all respects illustrative and not restrictive. Moreover, while nominal processing has be described and detailed, and to some degree alternate work pieces and systems, assemblies, etc. with regard thereto referenced, contemplated processes are not so limited. Accordingly, the scope of the subject invention is as defined in the language of the appended claims, and includes not insubstantial equivalents thereto.

That which is claimed:

1. A splicing assembly for rolled sheet material, said assembly comprising:
    a. first and second shafts, each shaft for operative support of a roll of rolled sheet material;
    b. a roll positioner for precise axial positioning of the roll of rolled sheet material on the shaft of said first and second shafts, said roll positioner including a push plate for roll engagement, and a controllable actuator operatively linked thereto, said push plate selectively translatable in a spaced apart condition along a length of the shaft of said first and second shafts via said controllable actuator;
    c. a drive assembly operatively linked to each of said first and second shafts in furtherance of selectively dispensing rolled sheet material from rolls of rolled sheet material carried upon said first or second shaft; and,
    d. a splicing apparatus for uniting a replacement roll of rolled sheet material with a winding down roll of rolled sheet material, said splicing apparatus comprising a sealing element and a sheet material carriage adapted and disposed for translation towards said sealing element, a free end portion of rolled sheet material of the replacement roll supported upon a shaft of said first or second shafts for selective retention by said sheet material carriage and for translation to, and thereafter with, a portion of rolled sheet material of the winding down roll supported upon the other shaft of said first or second shafts for urged combined engagement with said sealing element in furtherance of uniting the rolled sheet material of the rolls.

2. The assembly of claim 1 wherein said first and second shafts are coplanar.

3. The assembly of claim 1 wherein said first and second shafts are coplanar, said first shaft being an upper shaft, said second shaft being a lower shaft.

4. The assembly of claim 1 wherein said drive assembly comprises a driver, and first and second clutch assemblies, said driver operably linked to said clutch assemblies, each of said first and second clutch assemblies in turn operatively linked to said first and second shafts respectively.

5. The assembly of claim 1 wherein said splicing apparatus is spaced apart from and intermediate said first and second shafts.

6. The assembly of claim 1 wherein said splicing apparatus further comprises an actuator for selectively translating said sheet material carriage.

7. The assembly of claim 1 wherein said splicing apparatus further comprises a track segment, said sheet material carriage actuatably translatable along said track segment.

8. The assembly of claim 7 wherein said splicing apparatus further comprises an actuator for selectively translating said sheet material carriage along said track segment.

9. The assembly of claim 1 wherein said sheet material carriage includes a retainer for securing a free end portion of a replacement roll in relation to said sheet material carriage.

10. The assembly of claim 1 wherein said sheet material carriage includes a sealing pad disposed with respect thereto in opposition to said sealing element, said sealing pad urgingly engaging said sealing element via translation of said sheet material carriage towards and to said sealing element.

11. The assembly of claim 1 wherein said sealing element comprises a heating element.

12. The assembly of claim 1 wherein said sealing element comprises a resistive heating element.

13. The assembly of claim 1 further comprising an egress guide assembly for receipt of dispensed sheet material exiting said splicing apparatus, and passage of same intermediate said first and second shafts.

14. The assembly of claim 13 wherein said egress guide assembly includes guide rollers through which dispensed sheet material passes.

15. The assembly of claim 13 wherein said egress guide assembly includes a sensing element for detection of a characteristic or condition of dispensed sheeting material passing thereby.

16. The assembly of claim 13 wherein said egress guide assembly includes a sensing element for detection of both a characteristic and condition of dispensed sheeting material passing thereby.

17. The assembly of claim 13 wherein said egress guide assembly includes a photosensor for detection of indicia carried by or upon dispensed sheeting material passing thereby, said photosensor operatively linked with said drive assembly so as to selectively drive either or both of said first and second shafts in furtherance of registering sheet material from rolls of rolled sheet material supported by said first and second shafts.

18. The assembly of claim 13 wherein said splicing apparatus receives sheet material from a roll of rolled sheet material supported by either of said first or second shafts at a corresponding first deflector roller of said splicing apparatus and transfers the sheet material to said egress guide assembly via a corresponding second deflector roller of said splicing apparatus.

* * * * *